United States Patent [19]

Jarre et al.

[11] 4,258,141

[45] Mar. 24, 1981

[54] PROCESS FOR MANUFACTURE OF FLEXIBLE POLYURETHANE FOAMS WITH CYANIC ACID DERIVATIVES

[75] Inventors: Wolfgang Jarre, Ludwigshafen; Gerhard Mueller, Munich; Otmar Zipp, Osnabrueck; Eckhard Ropte, Ludwigshafen, all of Fed. Rep. of Germany

[73] Assignee: BASF Aktiengesellschaft, Ludwigshafen, Fed. Rep. of Germany

[21] Appl. No.: 28,663

[22] Filed: Apr. 10, 1979

[30] Foreign Application Priority Data

Apr. 11, 1978 [DE] Fed. Rep. of Germany ....... 2815554

[51] Int. Cl.$^3$ ............................................. C08G 18/14
[52] U.S. Cl. .................................. 521/114; 521/128; 521/131; 521/160
[58] Field of Search ................ 521/128, 160, 131, 114

[56] References Cited

U.S. PATENT DOCUMENTS

| | | | |
|---|---|---|---|
| 3,833,525 | 9/1974 | Orlando et al. | 521/128 |
| 3,897,372 | 7/1975 | Kehr et al. | 521/128 |
| 4,075,137 | 2/1978 | Sawachika et al. | 521/160 |
| 4,139,501 | 2/1979 | Rudner et al. | 521/136 |

FOREIGN PATENT DOCUMENTS 874430 8/1961 United Kingdom .
1417087 12/1975 United Kingdom .

OTHER PUBLICATIONS

Hackh's Chemical Dictionary, McGraw-Hill, N.Y., 1944, p. 245.
Argabright, J. Org. Chem., vol. 35, 1970, p. 2253.

*Primary Examiner*—Maurice J. Welsh
*Attorney, Agent, or Firm*—Norbert M. Lisicki

[57] ABSTRACT

The invention concerns a process for the manufacture of flame resistant flexible polyurethane foams by reacting a mixture of diphenylmethane diisocyanates and polyphenylene polymethylene polyisocyanates having a functionality greater than 2 containing 40 to 90 percent by weight diphenylmethane diisocyanate based on the total weight of said mixture; polyols, cyanic acid derivatives such as cyanamide, dicyandiamide, guanidine, biguanidine, melamine, cyanuric alkyl esterhydrazides and -amides as flame inhibitors, and blowing agents; as well as, possibly, chain extenders and other additives. The flexible polyurethane foams are suited for the familiar areas of applications, but especially as sound-insulation material for the construction industry.

16 Claims, No Drawings

PROCESS FOR MANUFACTURE OF FLEXIBLE POLYURETHANE FOAMS WITH CYANIC ACID DERIVATIVES

BACKGROUND OF THE INVENTION

1. Field of the Invention

The invention concerns a process for the manufacture of flame resistant flexible polyurethane foams. The foams are prepared inter alia from a mixture of, diphenylmethane diisocyanates and polyphenylene polymethylene polyisocyanates containing 40 to 90 percent by weight based on the total weight of said mixture, and cyanic acid derivatives, especially, melamine.

2. Description of the Prior Art

The manufacture of flexible polyurethane foams is known. Toluene diisocyanates or the commercially available mixtures of 2,4- and 2,6-toluene diisocyanate are usually used as polyisocyanates for this purpose. The disadvantage is that toluene diisocyanates, due to their high vapor pressure, are relatively strongly toxic and therefore, special precautionary measures must be taken and observed during their processing.

In order to reduce the toxicity hazard and increase the reactivity, it has been suggested to replace the toluene diisocyanates with mixtures of toluene diisocyanates and a mixture of homologous polyarylene polyalkylene polyisocyanates for the manufacture of polyurethane plastics, including foams.

According to data in British Pat. No. 874,430, flexible polyurethane foams are also produced by the reaction of polyether polyols having at least two hydroxyl groups and a polyisocyanate mixture consisting of diarylmethane diisocyanates and 5 to 50 percent of a polyisocyanate having a functionality of greater than 2 in the presence of water. According to German Published Application Ser. No. 24 25 657, diphenylmethane diisocyanate mixtures having an average isocyanate functionality of less than 2.4 and which contain not more than 60 percent by weight of 4,4'-diphenylmethane diisocyanate with at least 15 percent by weight of the diphenylmethane diisocyanate isomer content consisting of 2,4'-diphenylmethane diisocyanate, are well suited for the manufacture of integral skin foams.

However, all of these polyurethane foams have one drawback which precludes their possible use in numerous areas of application. This is their insufficient resistance to fire, especially their ready ignitability. In order to decrease this drawback, flame inhibitors, in particular, halogen and/or phosphorus-containing compounds have been therefore added or included in the polyurethane formulation. In many cases, the addition of these products has a negative effect upon the mechanical properties of the polyurethane foams obtained. Another drawback from the use of halogen and/or phosphorus-containing compounds is that toxic and corrosive off-gases are formed in case of a fire. In spite of numerous tests and great efforts, it has heretofore not been possible to produce flexible polyurethane foams which can be defined as hard-to-ignite as specified by DIN 4102.

SUMMARY OF THE INVENTION

The invention concerns a process for the manufacture of fire resistant flexible polyurethane foams by reacting a mixture of diphenylmethane diisocyanates and polyphenylene polymethylene polyisocyanates having a functionality greater than 2 containing 40 to 90 percent by weight diphenylmethane diisocyanates, based on the total weight of the mixture, polyols, cyanic acid derivatives such as cyanamide, dicyandiamide, guanidine, biguanidine, melamine, cyanuric alkyl esterhydrazides and -amides as flame inhibitors, and blowing agents; as well as, possibly, chain extenders and additives. The flexible polyurethane foams are suited for the familiar areas of applications, but especially as sound-insulation material for the construction industry.

DESCRIPTION OF THE PREFERRED EMBODIMENTS

The purpose of this invention was the manufacture of flame resistant flexible polyurethane foams based on non-toxic raw materials or at least those having low toxicity.

This task was met by a process for the manufacture of flame resistant flexible polyurethane foams by reaction of aromatic polyisocyanates, polyols, flame inhibitors, and foaming agents as well as, possibly, chain extenders and additives, which is characterized in that a mixture of diphenylmethane diisocyanates and polyphenyl polymethylene polyisocyanates containing 40 to 90 percent by weight of diphenylmethane diisocyanate based on the total weight of the mixture is used as aromatic polyisocyanates, and that derivatives of cyanic acid are used as flame inhibitor, and that water is used as blowing agent.

Surprisingly, it was found that the selection of the polyisocyanate mixture according to the invention and the special flame inhibitors from the multitude of known and commercially available polyisocyanates and flame inhibitors in combination with water or mixtures of water and low-boiling, possibly halogenated, hydrocarbons or dimethylether as blowing agents results in flexible polyurethane foams which are hard to ignite in accordance with DIN 4102.

For the manufacture of the flame resistant flexible polyurethane foams, there were used as organic polyisocyanates mixtures of diphenylmethane diisocyanates and polyphenyl polymethylene polyisocyanates containing 40 to 90 percent by weight, preferably 45 to 65 percent by weight, based on the total weight of the mixture, of diphenylmethane diisocyanate.

It is not critical in which quantity ratios to one another the isomeric 4,4'-, 2,4'- and 2,2'-diphenylmethane diisocyanates are present in the mixture. It is of primary importance to the invention that the total content of diphenylmethane diisocyanate isomers in the mixture corresponds with the above-mentioned concentration conditions. Preferably, however, there are used such mixtures containing less than 10 percent by weight, in particular, less than 3 percent by weight, of 2,4'-diphenylmethane diisocyanate based on the weight of diphenylmethane diisocyanate isomers. Instead of the simple isocyanate mixtures it is also possible to use those which are modified with small quantities of an alkylene diol or polyoxyalkylene diols such as propylene glycols, diethylene glycol and butylene glycol in order to reduce the tendency toward crystallization. The manufacture of such polyisocyanate mixtures, which are possibly modified with urethanes, with the corresponding content of diphenylmethane diisocyanate isomers is, for instance, described in German Published Application Ser. Nos. 24 25 658, 25 13 793, and 25 13 796.

Possible polyols are preferably linear, that is, difunctional polyester polyols and, in particular, polyether polyols having molecular weights of 400 to 7500, preferably of 2000 to 4500. However, basically linear, hydroxyl group-containing polymers with the said molecular weight can also be used. These include, for instance, polycarbonates, in particular, those produced from diphenyl carbonate and 1,6-hexanediol by transesterification, polyoxymethylenes and polyester polyamides.

Suitable polyester polyols may, for instance, be produced from dicarboxylic acids, preferably aliphatic dicarboxylic acids having 2 to 12, preferably 4 to 8, carbon atoms in the alkylene radical and multifunctional alcohols, preferably, diols.

Examples of this are aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane di-carboxylic acid; and aromatic dicarboxylic acids such as phthalic acid and terephthalic acid. Examples of di- and multifunctional, particularly trifunctional, alcohols are: ethylene glycol, diethylene glycol, propylene glycol, 1,3-propanediol, dipropylene glycol, 1,10-decanediol, glycerine, trimethylolpropane, and, preferably, 1,4-butanediol and 1,6-hexanediol. If trifunctional alcohols are used in part for the manufacture of the primarily linear polyester polyols, their share must be calculated in such a manner that the functionality of the obtained polyester polyols is 2.8 maximum.

Preferably, however, there are used as polyols primarily linear polyether polyols which are produced according to familiar methods from one or more alkylene oxides with 2 to 4 carbon atoms in the alkylene radical and a starter molecule containing 2 to 3, preferably 2, active hydrogen atoms. Suitable alkylene oxides include 1,2- or 2,3-butylene oxide, styrene oxide, and preferably, ethylene oxide and 1,2-propylene oxide. The alkylene oxides may be used individually, alternatingly in sequence, or as mixtures. Comparable products prepared from tetrahydrofuran and oxetane can also be employed. Possible starter molecules include: water, dicarboxylic acids such as succinic acid, adipic acid, phthalic acid and terephthalic acid; N,N'-dialkyl-substituted diamines having 1 to 4 carbon atoms in the alkyl radical such as dialkyl-substituted ethylenediamine; 1,2- or 1,3-propanediamine, 1,4-butanediamine, 1,6-hexanediamine, 4,4'-, 2,4'- and 2,2'-diaminodiphenylmethane, N-alkyldiethanolamine; and, preferably, multifunctional, in particular difunctional, alcohols such as ethylene glycol, propylene glycol, diethylene glycol, dipropylene glycol, 1,4-butanediol, 1,6-hexanediol, glycerine and trimethylolpropane.

Preferably there are used primarily linear polyether polyols having molecular weights of 400 to 7500, preferably of 2000 to 4500, and hydroxyl numbers from 20 to 200, preferably from 25 to 80, which contain oxyethylene units as well as oxypropylene units in the oxyalkylene chain, with these substances being arranged in the oxyalkylene chain either randomly or as blocks. In particular, those polyether polyols which contain primary hydroxyl end groups are used.

For the manufacture of flexible polyurethane foams with particular mechanical properties, it may serve a purpose to also use difunctional chain extenders in addition to the polyols. To be taken into consideration as chain extenders, there are especially aliphatic diols with 2 to 6 carbon atoms such as ethylene glycol, 1,4-butanediol and 1,6-hexanediol and aromatic aliphatic diols such as the bis-(2-hydroxyethyl)-ether of hydroquinone.

An important characteristic of this invention is based upon the combination of the selected mixture of diphenylmethane diisocyanates and polyphenyl polymethylene polyisocyanates containing 40 to 90 percent by weight of diphenylmethane diisocyanate and the flame inhibitors based on cyanic acid derivatives.

As cyanic acid derivatives, in the sense of this invention, there are to be understood not only cyanic acid derivatives in the more restricted sense of the word, but also compounds which can be manufactured from cyanic acid and which also include the derivatives of carbonic acid and cyanuric acid, (carbonates and cyanurates).

In detail, these include cyanic acid derivatives in the sense of the invention such as cyanamide, dicyandiamide and in particular, guanidine salts, biguanidine, and cyanuric acid and its derivatives such as cyanuric acid ester having 1 to 10 carbon atoms in the alkyl radical and cyanuric acid hydrazides and amides such as melamine and its condensation product with 1 to 6 mols of formaldehyde per mol of melamine. Particularly effective and, therefore, preferably used are the commercial products dicyandiamide, and, particularly, melamine. The cyanic acid derivatives are added to the foamable polyurethane mixture in quantities of 10 to 70 percent by weight, preferably, 20 to 50 percent by weight, based on the weight of the mixture of isocyanates.

Another characteristic of the process according to the invention is the use of water as blowing agent which reacts with the isocyanate mixture and provides carbon dioxide. Preferably, 2 to 5 percent by weight, in particular, 2.5 to 3.5 percent by weight, of water is used, based on the weight of the polyol. Instead of water alone, mixtures of water with chemically inert, low-boiling, possibly halogenated hydrocarbons can also be used as foaming agents. Possible substances include halogenated hydrocarbons having boiling points below 50° C., preferably, between −50° C. and +30° C., at atmospheric pressure. These include, for example, halogenated hydrocarbons such as monochlorodifluoromethane, dichloromonofluoromethane, dichlorodifluoromethane, trichlorofluoromethane, and their mixtures and hydrocarbons such as propane, n-butane, and isobutane, as well as dimethyl ether. Suitable mixtures of water and possibly, halogenated hydrocarbons generally consist of 5 to 70 percent by weight, preferably, 10 to 50 percent by weight, of water and 30 to 95 percent by weight, preferably 50 to 90 percent by weight, of possibly halogenated hydrocarbons, with the percentage by weight being based on the total weight of the blowing-agent mixture.

The required quantities of blowing agent mixture can be determined in a simple manner as a function of the mixing ratio of water to possibly halogenated blowing agents as well as the desired foam density and are approximately 2 to 40, preferably, 5 to 25 percent by weight, based on the weight of the polyol.

Catalysts which accelerate the formation of polyurethane and optionally additives which are normally used for the manufacture of flexible polyurethane foams can also be added to the foamable reaction mixtures. These include, for instance, surface-active materials, pore-regulating agents, antioxidants, hydrolysis-prevention agents, dyes, fillers and other additives.

Suitable catalysts for accelerating the reaction between the polyols, the water, possibly chain extenders, and the polyisocyanate mixture according to this invention are, for instance, tertiary amines such as dimethylbenzylamine, N,N,N',N'-tetramethyldiaminodiethyl ether, bis-(dimethylaminopropyl) urea, N-methyl- or N-ethylmorpholine, dimethyl piperazine, 1,2-dimethylimidazole, 1-azo-bicyclo-(3,3,0)-octane, and preferably, triethylenediamine; metal salts such as lead octoate, tin di-2-ethylhexoate, and preferably, tin-(II) salts, and dibutyltin dilaurate as well as, in particular, mixtures of tertiary amines and organic tin salts. Preferably used are 0.5 to 5 percent by weight of catalyst based upon tertiary amines and/or 0.01 to 2.5 percent by weight of metal salts, based on the polyol weight.

Other materials to be taken into consideration include surface-active substances which serve to support the homogenization of the raw material and which are possibly also suited to regulate the cell structure of the flexible polyurethane foams. These include, for example, siloxane-oxyalkylene mixed polymers and other organic polysiloxanes; oxyethylated alkylphenols, oxyethylated fatty alcohols, paraffin oils, castor oil or ricinoleic esters and turkey red oil, which are used in quantities of 0.2 to 6 parts by weight per 100 parts by weight of polyisocyanate mixture.

More detailed data on the above-named other commonly used additives are contained in the literature, for instance, in the monograph by J. H. Saunders and K. C. Frisch, "High Polymers", volume XVI, Polyurethanes, Parts 1 and 2, Interscience Publishers, 1962 and 1964.

The flexible polyurethane foams according to this invention may be manufactured according to the prepolymer process and preferably, according to the one-shot process.

If the flexible polyurethane foams are produced according to the one-shot process, a mixture of polyol, cyanic acid derivates, water, catalyst, and possibly chain extenders and additives, is usually reacted with the polyisocyanate mixture to be used according to this invention at temperatures of 15° to 60° C., preferably of 25° to 40° C., in such quantities that the ratio of hydroxyl groups of the polyols and possibly chain extenders to NCO groups of the polyisocyanate mixture is 0.1 to 0.4:1, preferably 0.15 to 0.3:1, and that the ratio of all Zerewitinoff active-hydrogen atoms, bonded to polyol, possibly chain extenders and water, to the NCO group of the polyisocyanate mixture is approximately 0.7 to 1.3:1, preferably, 0.9 to 1.1:1. If the flame inhibitors have reactive NH groups, they are not taken into consideration in the aforementioned quantity ratios.

Using a mixing chamber with several feed nozzles, the liquid raw materials can be used individually or, if the components are solid, in the form of solutions or suspensions and can be mixed intensively in the mixing chamber. However, it has proven to be particularly appropriate to work according to the two-component process and to combine the mixture of polyol, cyanic acid derivate, water, catalyst, possibly chain extenders and additives, as component A and to use the polyisocyanate mixture according to the invention as component B.

In order to manufacture the NCO-group-containing prepolymers, the polyisocyanate mixture according to this invention is reacted with the above-mentioned polyols and/or chain extenders in such quantities that the ratio of NCO groups to total hydroxyl is 10:1 to 95:1, preferably, 70:1 to 90:1. The obtained prepolymers are subsequently mixed with the cyanic acid derivatives, water or mixtures of water and low-boiling, possibly halogenated hydrocarbons and, possibly, additional polyols and/or chain extenders, catalysts and additives, and the mixture is allowed to foam.

The flexible polyurethane foams manufactured in accordance with this invention are difficult to ignite in accordance with DIN 4102 and are suited for the known applications for flexible foams, in particular, however, as sound-insulation material for the construction industry.

The parts referred to in the examples are parts by weight.

EXAMPLE 1

For the manufacture of flexible polyurethane foam a mixture of 700 g. of a difunctional polyether polyol based on ethylene oxide and propylene oxide and having an OH number of 28,
22.4 g. of water,
2.8 g. of amine catalyst (commercial product Niax® A1 of Union Carbide Corporation),
1.4 g. of triethylenediamine,
5.8 g. of foam stabilizer based on polysiloxane-polyoxyalkylene polymer (commercial product Tegostab®B 4690 by Goldschmidt AG, in Essen),
105 g. trichlorofluoromethane, and
240 g. melamine is mixed intensively at room temperature with 430 g. of a urethane-modified mixture of diphenylmethane diisocyanates and polyphenylene polymethylene polyisocyanates, the mixture containing 65 percent by weight of diphenylmethane diisocyanates and having a viscosity of 140 centipoises and an isocyanate content of 28.6 percent.

The obtained flexible polyurethane foam has the following mechanical properties:
Density: 53 (g/l)
Tensile Strength: 0.103 (N/mm$^2$)
Strength:
    at 20% Compression 0.42 (N/mm$^2$)
    at 40% Compression 0.65 (N/mm$^2$)
    at 60% Compression 1.32 (N/mm$^2$)
Graves Tear Strength: 0.6 (N/mm)
Burning Behavior (Furnace Test):
According to DIN 4102: B 1
Free Hanging: 4 cm. Thick
Glued On: 1 and 4 cm. Thick
Sound-Absorption Capacity: see the FIGURE The degree of sound absorption was measured in accordance with DIN 52 215-63.
Pipe:
    Length $L_1 = 1000$ mm.; $L_2 = 280$ mm.
    Cross Section $D = 99$ mm.$^2$; $D = 29$ mm.$^2$.

Curve 1 in the FIGURE illustrates the degrees of sound absorption with vertical incidence.
Curve 2 illustrates the degree of sound absorption converted to statistical sound incidence.

COMPARISON EXAMPLE A

In order to manufacture a conventional flexible polyurethane foam, a mixture consisting of 700 g. of a trifunctional polyether polyol based on ethylene oxide and propylene oxide and with an OH number of 35,
3 g. of water,
6 g. of a tetrafunctional polyether polyol based on an aliphatic diamine and propylene oxide having an OH number of 480, 0.2 g. dimethylcyclohexylamine,
0.7 g. triethylenediamine,
0.2 g. of a foam stabilizer based on polysiloxane-polyoxyalkylene polymerizate (commercial product Tegostab B 4113 by Goldschmidt AG, in Essen),
0.5 g. N-ethylmorpholine, and
0.7 g. 1,4-butanediol
is mixed intensively at room temperature with
302 g. of a mixture of 2,4- and 2,6-toluene diisocyanates in a weight ratio of 80:20.

The obtained flexible polyurethane foam, which has a density of 50 grams per liter, completely burns in the combustion test according to DIN 4102.

EXAMPLES 2-7

To a mixture of
600 parts of polyol,
16.2 parts of water,
1.2 parts of amine catalyst (commercial product Desmorapid ® PV by Bayer AG),
1.2 parts of bis(beta-(N,N-dimethylamino)-alkyl-ether,
1.2 parts triethylenediamine,
8.4 parts of foam stabilizer (Tegostab ®B 4690), and
90 parts of fluorotrichloromethane, 15 percent by weight of melamine based on the total weight of the foamable mixture is added, and the mixture is intensively mixed at room temperature with a urethane-modified mixture of diphenylmethane diisocyanates and polyphenylene polymethylene polyisocyanates (crude MDI) having a diphenylmethane diisocyanate content of 50 to 55 percent by weight, and the mixture is allowed to foam.

The following were used as polyols:
Polyol A: Activated polyether polyol based on dipropylene glycol, propylene oxide, and ethylene oxide with an OH number of 28;
Polyol B: activated polyether polyol based on glycerine, propylene oxide, and ethylene oxide with an OH number of 35;
Polyol C: activated block polyether polyol based on glycerine, ethylene oxide, and propylene oxide with an OH number of 27;
Polyol D: activated polyether polyol based on ethylenediamine, propylene oxide, and ethylene oxide with an OH number of 60;
Polyol E: polyester polyol with an OH number of 56, commercial product Desmophen ® 2001 by Bayer AG;
Polyol F: polyester polyol with an OH number of 60, commercial product Elastophen ® 2804 by Elastogran GmbH, Lemforde.

In order to test the flammability, one milliliter of methanol was sprayed onto a foam sample with dimensions of 15×15×2 cm. in such a manner that a wetted area of approximately 2 cm. diameter was formed on the lower side of the foam sample. The sample pretreated in this manner was placed on a wire lattice having a mesh of 0.5 cm. in a protected chamber and the foam sample was ignited at the point wetted with methanol.

In order to evaluate the flammability, the diameter of the resulting hole, the flame transfer, and the percentage by weight of the burned foam were determined.

The results are summarized in Table I.

TABLE I

| Example | Polyol | Isocyanate Mixture (parts) | % by Weight of Burned Foam | Diameter of the Hole Resulting From the Fire (cm.) | Comments |
|---|---|---|---|---|---|
| 2 | Polyol A | 295.8 | 3.5 | 4.8 | Hard to Ignite |
| 3 | Polyol B | 306.6 | 3.6 | 5 | Hard to Ignite |
| 4 | Polyol C | 295.8 | 6.5 | 6.5 | Hard to Ignite |
| 5 | Polyol D | 344.4 | 3.9 | 4.6 | Hard to Ignite |
| 6 | Polyol E | 338.4 | 12.7 | 9.8 | Hard to Ignite |
| 7 | Polyol F | 344.4 | 12.5 | 9.0 | Hard to Ignite |

EXAMPLES 8-10

Instead of the melamine, the cyanic acid derivatives listed in Table II are used.

TABLE II

| Example | Cyanic Acid Derivates | % by Weight of Burned Foam | Diameter of the Hole Resulting From the Fire (cm) |
|---|---|---|---|
| 8 | Cyanamide | 8.3 | 6.1 |
| 9 | Guanidine carbonate | 3.8 | 5.2 |
| 10 | Cyanoguanidine | 5.3 | 5.4 |

EXAMPLE 11

The procedure of Example 2 was duplicated with the exception that 280.9 parts of a commercially available crude MDI having a diphenylmethane-diisocyanate content of 40 to 45 percent by weight is used as polyisocyanate.

EXAMPLE 12

A mixture of
300 parts of an activated polyether polyol based on dipropylene glycol, propylene oxide and ethylene oxide with an OH number of 28 (Polyol A),
6 parts of water,
0.6 parts of Desmorapid ®PV,
0.6 parts of bis(beta-(N,N-dimethylamino)-alkyl) ether,
0.6 parts of triethylenediamine,
8.4 parts of Tegostab ®B 4690,
35 parts of monofluorotrichloromethane, and
81.6 parts of melamine
is mixed intensively at room temperature with 119.9 parts of a urethane-modified crude MDI mixture having a diphenylmethane diisocyanate content of 60 to 65 percent by weight, and the reaction mixture is allowed to foam.

EXAMPLE 13

The procedure of Example 2 was duplicated with the exception that 13.5 parts of water instead of 6 parts, 4.2 parts of Tegostab B 4690 instead of 8.4 parts, and 242.3 parts of the urethane-modified crude MDI mixture instead of 119.9 parts were employed.

COMPARISON EXAMPLE B 300 parts Polyol A,
16.2 parts water,
0.6 parts Desmorapid PV, 0.6 parts bis(-beta-(N,N-dimethylamino)-alkyl) ether,
0.6 parts triethylenediamine,
4.2 parts Tegostab B 4690, and
45 parts fluorotrichloromethane
are mixed at room temperature with 181.4 parts of a commercially available 2,4- and 2,6-toluene diisocyanate at a weight ratio of 80:20 and the obtained mixture is allowed to foam.

COMPARISON EXAMPLE C

The procedure of Comparison Example B was duplicated with the exception that 71.5 parts of melamine were added to the foamable reaction mixture.

COMPARISON EXAMPLE D

The procedure of Example 11 was duplicated with the exception of the addition of the melamine.

The flammability-test results of Examples 11 to 13 and Comparison Examples B to D are summarized in Table III.

TABLE III

| Example/ Comparison Example | Percent By Weight of Burned Foam | Diameter of the Burned Hole (cm.) | Comments |
|---|---|---|---|
| 11 | 12.5 | 7.6 | Hard to Ignite |
| 12 | 8.3 | 6.6 | Hard to Ignite |
| 13 | 5.3 | 5.2 | Hard to Ignite |
| B | 100% | — | Foam Ignites and |
| C | 100% | — | Burns |
| D | 100% | — | Completely |

The embodiments of the invention in which an exclusive property or privilege is claimed are defined as follows:

1. A process for the manufacture of flame-resistant flexible polyurethane foams by a reaction of aromatic polyisocyanates, polyols, flame inhibitors, and blowing agents as well as optionally, chain extenders and additives, wherein a mixture of diphenylmethane diisocyanates and polyphenylene polymethylene polyisocyanates containing 40 to 90 percent by weight diphenylmethane diisocyanates based on the total weight of said mixture is used as aromatic polyisocyanate, and that a cyanic acid derivative selected from the group consisting of cyanamide, dicyandiamide, guanidine, biguanidine, cyanoguanidine, guanidine carbonate, cyanuric acid alkyl ester having 1 to 10 carbon atoms in the alkyl radical, cyanuric acid hydrazide, and melamine is used as the flame inhibitor, and water is used as the blowing agent.

2. The process according to claim 1, wherein the mixture of diphenylmethane diisocyanates and polyphenylene polymethylene polyisocyanates contains 45 to 65 percent by weight of diphenylmethane diisocyanates based on the total weight of said mixture.

3. The process according to claim 1, wherein the mixture of diphenylmethane diisocyanates and polyphenylene polymethylene polyisocyanates contains less than 10 percent of 2,4'-diphenylmethane diisocyanate based on the weight of the diphenylmethane diisocyanate isomers.

4. The process according to claim 1, wherein the mixture of diphenylmethane diisocyanates and polyphenylene polymethylene polyisocyanates contains less than 10 percent of 2,4'-diphenylmethane diisocyanate based on the weight of the diphenylmethane diisocyanate isomers.

5. The process according to claim 1, wherein melamine is used as the flame inhibitor.

6. The process according to claim 5, wherein melamine is used in a quantity of 10 to 70 percent by weight based on the amount of polyisocyanate.

7. The process according to claim 1, wherein water, in a quantity of 2 to 5 percent by weight based on the amount of polyol used, is used as blowing agent.

8. The process according to claim 7, wherein water is used in the form of a mixture with blowing agents selected from the group consisting of low-boiling hydrocarbons, ether, and low-boiling halogenated hydrocarbons.

9. Flexible polyurethane foams prepared by the reaction of aromatic polyisocyanates, polyols, flame inhibitors, blowing agents and optionally chain extenders and additives, wherein a mixture of diphenylmethane diisocyanates and polyphenylene polymethylene polyisocyanates containing 40 to 90 percent by weight diphenylmethane diisocyanates based on the total weight of said mixture is used as the aromatic polyisocyanate, and that a cyanic acid derivative selected from the group consisting of cyanamide, dicyandiamide, guanidine, biguanidine, cyanoguanidine, guanidine carbonate, cyanuric acid alkyl ester having 1 to 10 atoms in the alkyl radical, cyanuric hydrazide, and melamine is used as the flame inhibitor and water is used as the blowing agent.

10. The flexible polyurethane foam of claim 9 wherein the mixture of diphenylmethane diisocyanates and polyphenylene polymethylene polyisocyanates contains 45 to 65 percent by weight of diphenylmethane diisocyanates based on the total weight of said mixture.

11. The flexible polyurethane foam of claim 10 wherein the mixture of diphenylmethane diisocyanates and polyphenylene polymethylene polyisocyanates contains less than 10 percent of 2,4'-diphenylmethane diisocyanate based on the weight of the diphenylmethane diisocyanate isomers.

12. The flexible polyurethane foams of claim 9 wherein the mixture of diphenylmethane diisocyanates and polyphenylene polymethylene polyisocyanates contains less than 10 percent of 2,4'-diphenylmethane diisocyanate based on the weight of the diphenylmethane diisocyanate isomers.

13. The flexible polyurethane foam of claim 9 wherein melamine is used as the flame inhibitor.

14. The flexible polyurethane foam of claim 13 wherein melamine is used in a quantity of 10 to 70 percent by weight based on the amount of polyisocyanate.

15. The flexible polyurethane foam of claim 13 wherein water, in a quantity of 2 to 5 percent by weight based on the amount of polyol used, is used as blowing agent.

16. The flexible polyurethane foam of claim 15 wherein water is used in the form of a mixture with blowing agents selected from the group consisting of low-boiling hydrocarbons, ether, and low-boiling halogenated hydrocarbons.

* * * * *